Patented July 19, 1938

2,123,929

UNITED STATES PATENT OFFICE 2,123,929

PHOTOCHEMICALLY STABILIZED THIO-DI-ARYLAMINE PARASITICIDAL COMPOSITION

Euclid W. Bousquet, Wilmington, Del., assignor, by mesne assignments, to E. I. du Pont de Nemours & Company, Wilmington, Del., a corporation of Delaware No Drawing. Application January 6, 1936, Serial No. 57,781

5 Claims. (Cl. 167—30)

The present invention relates to parasiticidal compositions which contain as an active toxic ingredient a thio-diarylamine and a substance which acts as a photochemical inhibitor to prevent inactivation of the thio-diarylamine when exposed to sun and daylight or other lights rich in ultra-violet rays.

Thio-diarylamine compositions are being used to combat various parasiticidal pests on vegetation and have particularly been found efficient as stomach poisons for insects. They suffer, however, from the disadvantage of being sensitive to light and oxygen, and on exposure to atmospheric conditions they gradually lose their potency and become biologically inactive.

I found that ultra-violet rays greatly accelerate the atmospheric inactivation of thio-diarylamine parasiticides and I found that this inactivation can be greatly inhibited if substances are intimately admixed with the thio-diarylamines which preferentially absorb, or otherwise prevent transmittal of ultra-violet rays, so-called ultra-violet opacifiers.

The atmospheric inactivation of thio-diarylamine parasiticides is accompanied with a discoloration which throws the color of the product toward the short wave length end of the spectrum: the original slightly yellowish to brownish thio-diarylamine becomes greenish to bluish on exposure to ultra-violet light and such discolored products greatly lose their efficiency as parasiticides.

This photochemical discoloration of thio-diarylamines can easily be shown in the case of thio-diphenylamine in the following manner:

Strips of cloth were impregnated with a 10% solution of thio-diphenylamine in acetone, and the solvent allowed to evaporate. These strips were exposed at about 15 inches distance to light of a mercury vapor lamp and the changes in color noted. The unexposed strips were yellow; after 3 hours they became light green, after 6 hours green, and after 20 hours very dark green. Samples of thio-diphenylamine which through exposure to light had become dark green had a greatly diminished toxicity towards insects. The effect of ultra-violet opacifiers on the color-stability of thio-diarylamines can be tested in a similar manner by impregnating similar strips of cloth with a thio-diphenylamine solution which contains in solution or suspension, for instance, 5% (based on the thio-diphenylamine content of the solution) of the susbtance to be tested.

Various substances tested in this manner have shown that after 20 hours' exposure to the strong ultra-violet light substantially no green coloration appeared, though in some instances the yellowish color of the test strip turned darker.

Thio-diarylamines admixed with such opacifiers maintained substantially their full parasiticidal efficiency after exposure to sun or daylight.

Substances which have the property of absorbing or preventing the transmittal of ultra violet rays and which were found to inhibit photochemical inactivation of thio-diarylamine parasiticides are, for instance: tetramethyl diamino benzophenone (Michler's ketone), cerium compounds, for instance cerium oxide or cerium oxalate, or double salts of cerium and alkali metal salts, other rare earth metal salts, beta-methyl umbelliferon, carbon black, $TiO_2$, etc.

The thio-diarylamine insecticides which are amenable to the effect of my novel inactivation inhibitors are water insoluble compounds of the general formula:

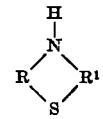

in which R and $R^1$ are aromatic nuclei.

The prototype of these compounds is thio-diphenylamine, which is produced, for instance, by heating diphenylamine with sulfur in the presence of a catalyst, such as aluminum chloride, ferric chloride, iodine, etc.

Other members of the novel group of insecticides, according to my invention, are the thio compounds obtained by the action of sulfur upon diarylamines such as, for instance, those obtained from phenyl-alpha-naphthyl amine which presumably has the formula:

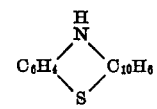

or from phenyl-beta-naphthylamine,
di-alpha-naphthylamine,
di-beta-naphthylamine,
di-biphenylamine,
N,N-diphenyl-p-phenylenediamine,
N,N-di-alpha-naphthyl-para-phenylene-diamine,
N,N-di-biphenyl-metaphenylene-diamine,
N,N-di-phenyl-metaphenylene-diamine,
p,p'-di(phenyl-amino) di-phenylamine, etc.

The thio derivatives obtained from these diarylamines are all characterized by containing the heterocyclic nucleus:

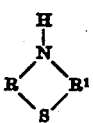

in which R and $R^1$ are aromatic nuclei in each of which two adjacent carbon atoms take part in forming the heterocyclic carbon-nitrogen-sulfur ring.

Some of the hydrogen atoms normally attached to R and $R^1$ may be substituted, or replaced by alkyl, cycloalkyl, aryl, heterocyclic nuclei, or halogen, nitro, amino, alkoxy or aryloxy groups.

The effect of the ultra-violet opacifiers, of inhibiting the photochemical inactivation of thioarylamine parasiticidal compositions is made use of by intimately mixing these substances in small amounts, for instance, of from 1 to 10% with the parasiticidal compositions. I can for instance grind together the thio-diarylamine and the opacifier; or I may dissolve both in a common solvent and after evaporation of the solvent obtain an intimate mixture of the two. In other instances I might add the opacifier, for instance carbon black, to the molten thio-diarylamine, possibly during the process of its manufacture or in any other convenient manner. When using aqueous sprays I may dissolve the opacifier in the aqueous spray liquid or suspend it in the spray mixture.

The benefit of reduced photochemical inactivation by means of ultra-violet opacifier is available in all conventional parasiticidal compositions containing a thio-diarylamine, namely, in aqueous sprays containing spreaders, sticking and wetting agents, etc., as well as in dry dusts which may contain the usual inert diluents such as talc, silica, etc.

In the case of thio-diphenylamine I found that tetramethyl-diaminobenzophenone in amount of about 5% is of particular efficiency as it maintains its parasiticidal efficiency on exposure to light and air for such periods of time when in the absence of such an opacifier its efficiency greatly diminishes.

I claim:

1. A parasiticidal composition stabilized against photochemical inactivation comprising as an active parasiticidal ingredient a thio-diarylamine and an ultra-violet opacifier in such an amount as to retard photochemical inactivation of thio-diarylamine.

2. A parasiticidal composition stabilized against photochemical inactivation comprising thio-diphenylamine and an ultra-violet opacifier in such an amount as to retard atmospheric inactivation of thio-diphenylamine.

3. A parasiticidal composition comprising thio-diphenylamine and an amount of tetramethyl diamino benzophenone sufficient to stabilize the thio-diphenylamine against photochemical inactivation.

4. A parasiticidal composition comprising thio-diphenylamine and an amount of cerium oxalate sufficient to stabilize the thio-diphenylamine against photochemical inactivation.

5. A parasiticidal composition comprising thio-diphenylamine and an amount of beta-methyl umbelliferon sufficient to stabilize the thio-diphenylamine against photochemical inactivation.

EUCLID W. BOUSQUET.